Feb. 17, 1970  A. C. BILLINGHAM  3,495,551
MACHINES FOR MAKING FROZEN CONFECTIONS
Filed Feb. 13, 1967  13 Sheets-Sheet 1

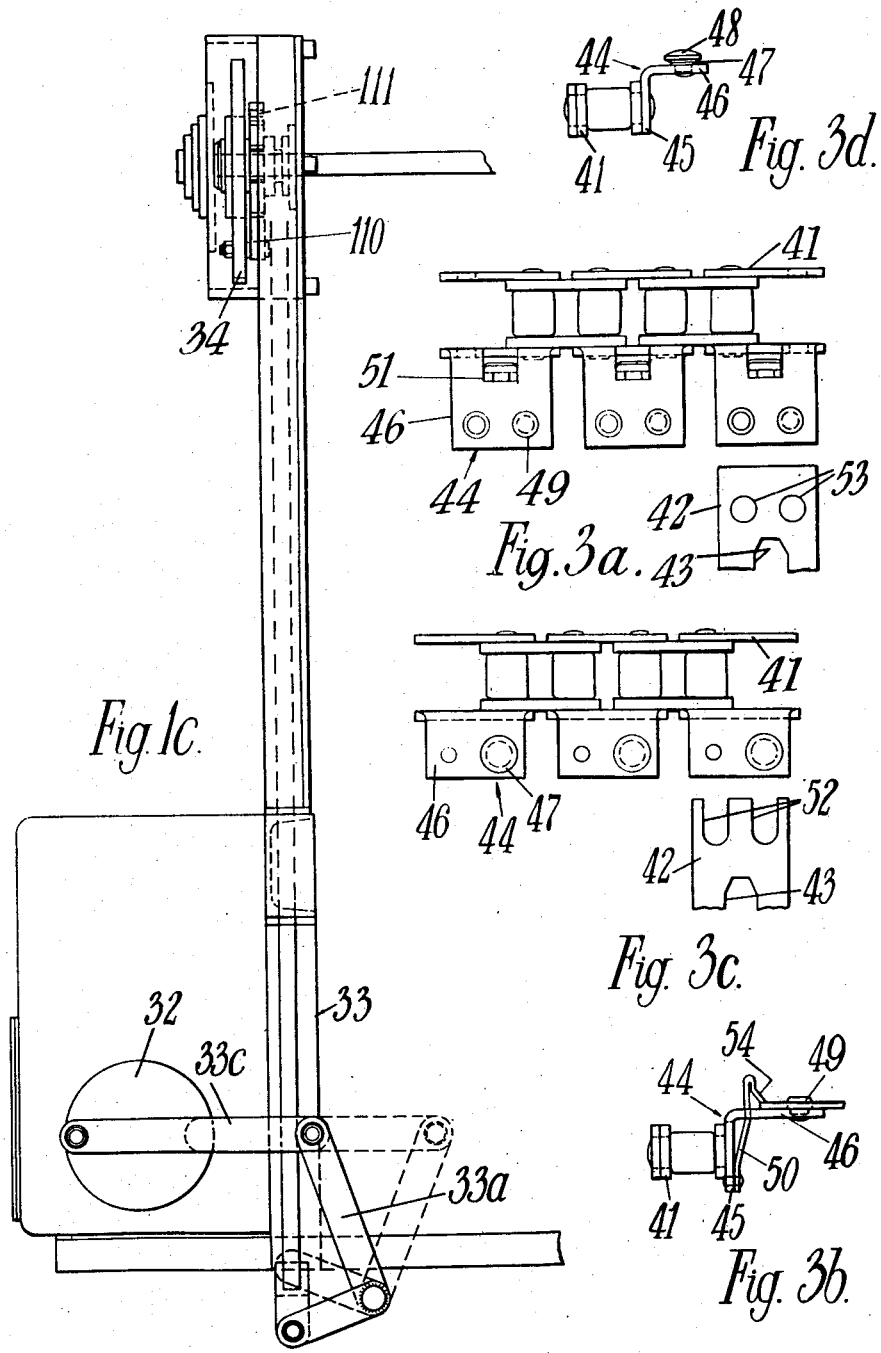

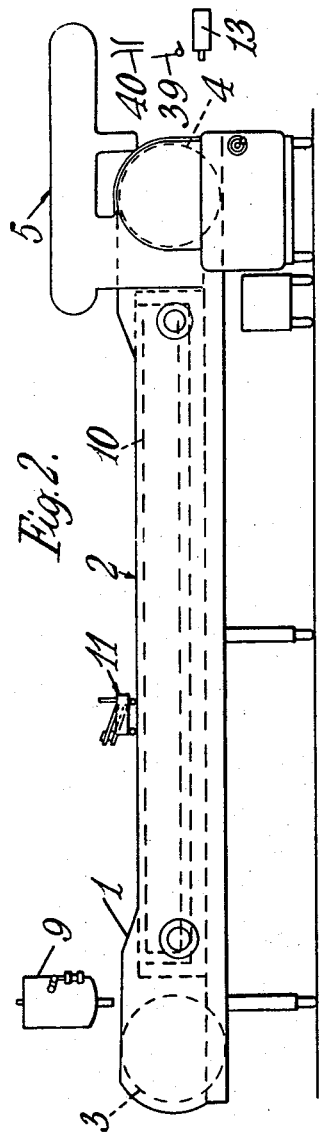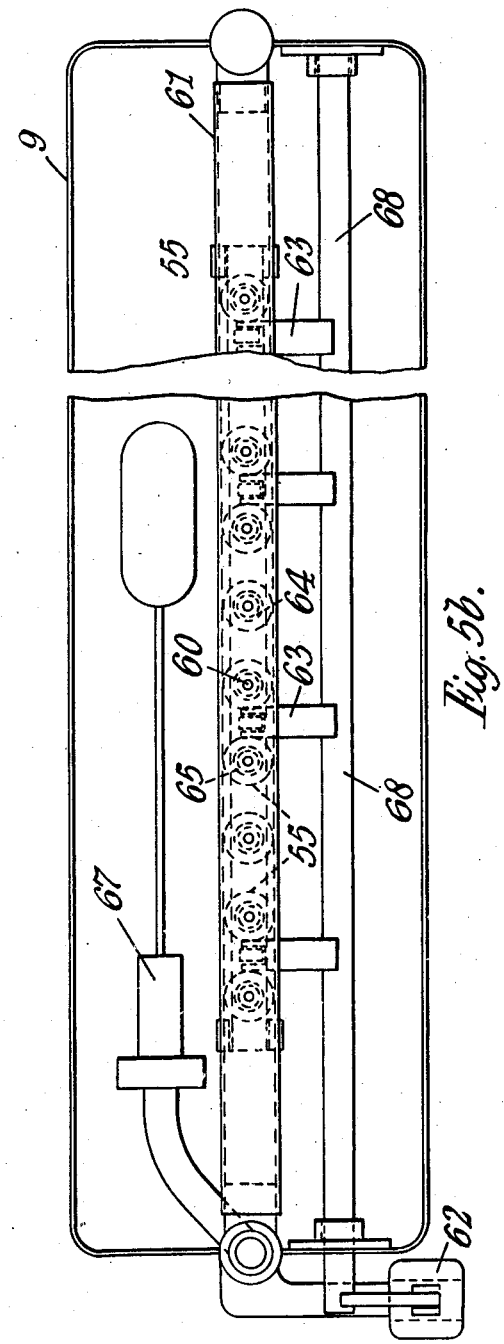

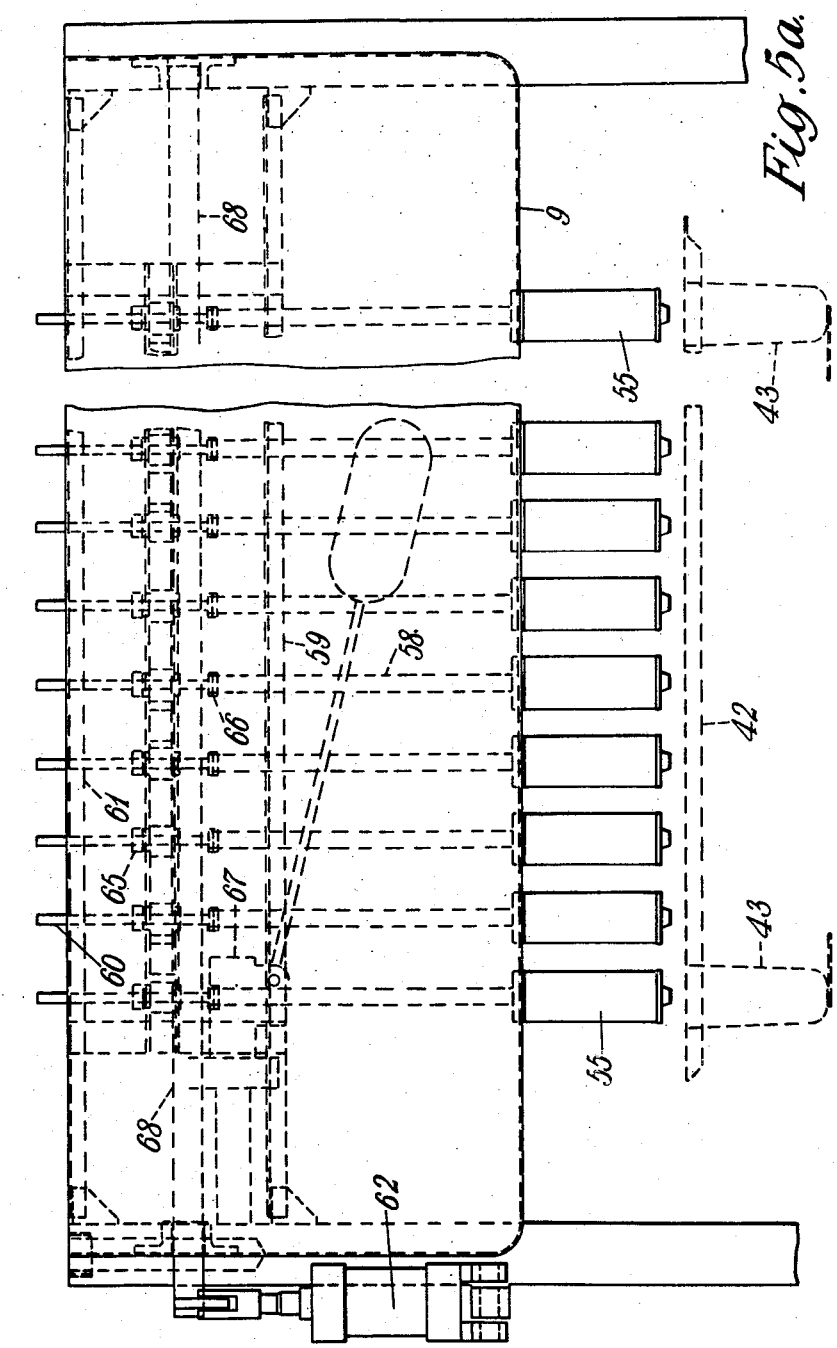

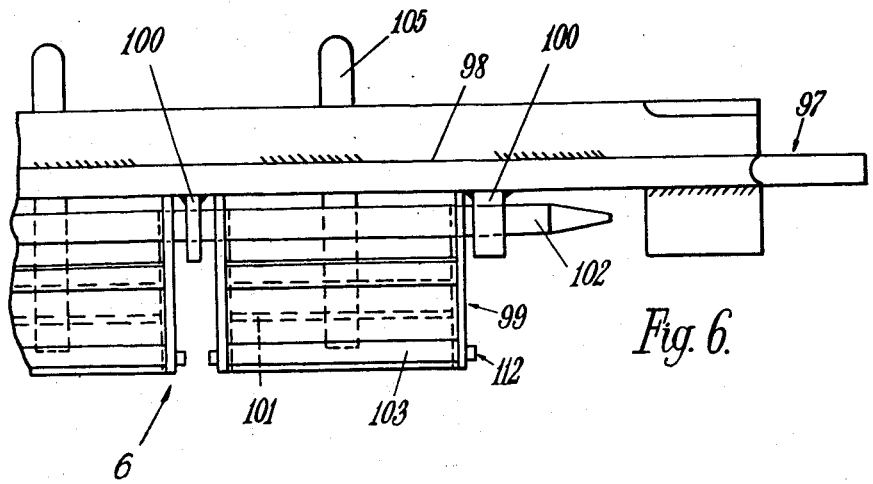
Fig. 6.
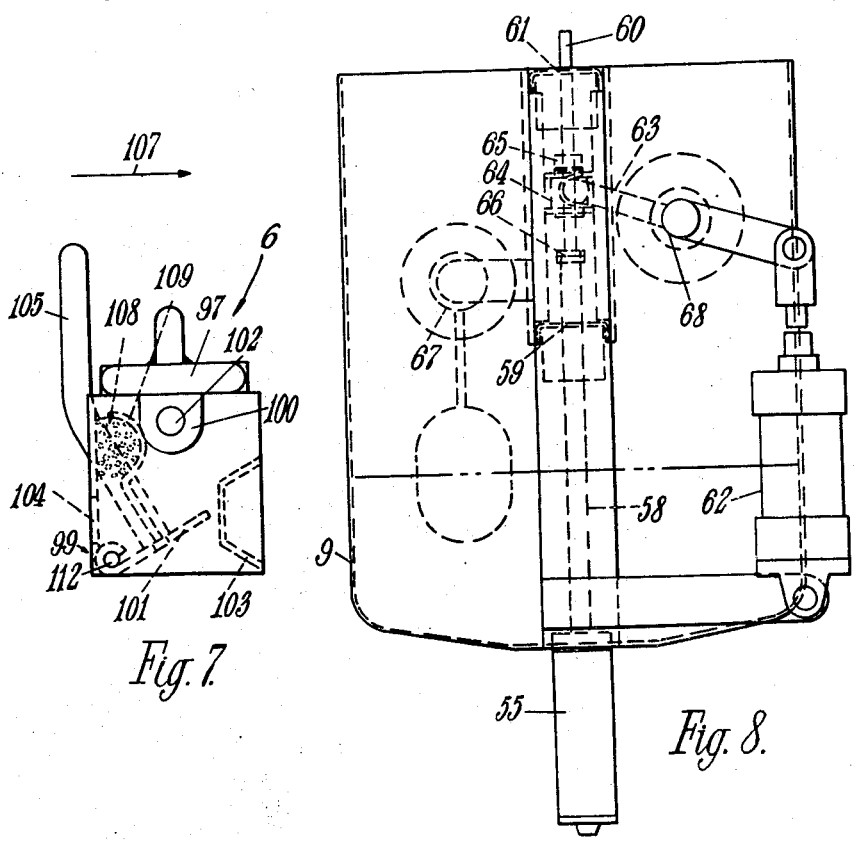
Fig. 7.
Fig. 8.

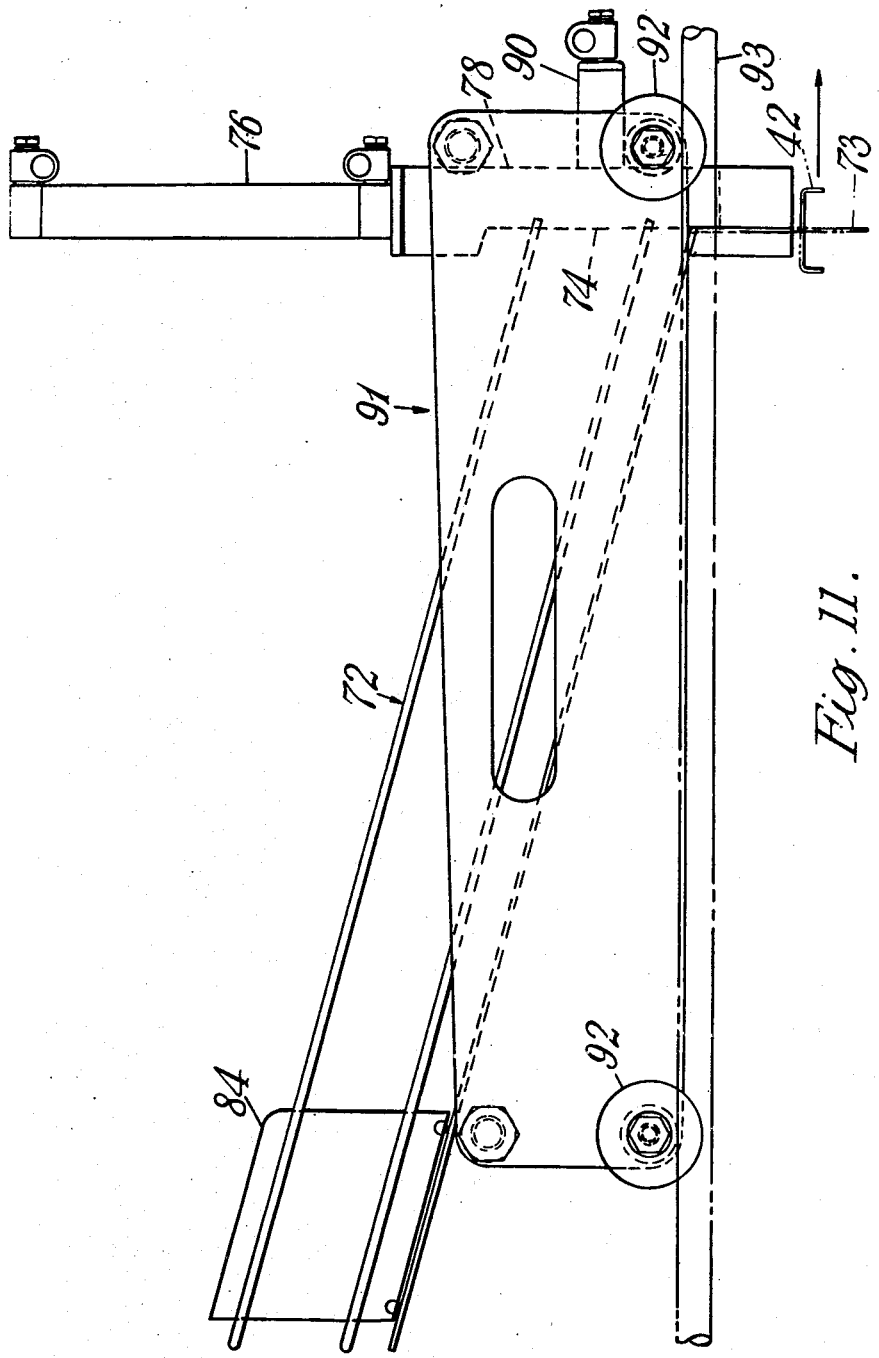

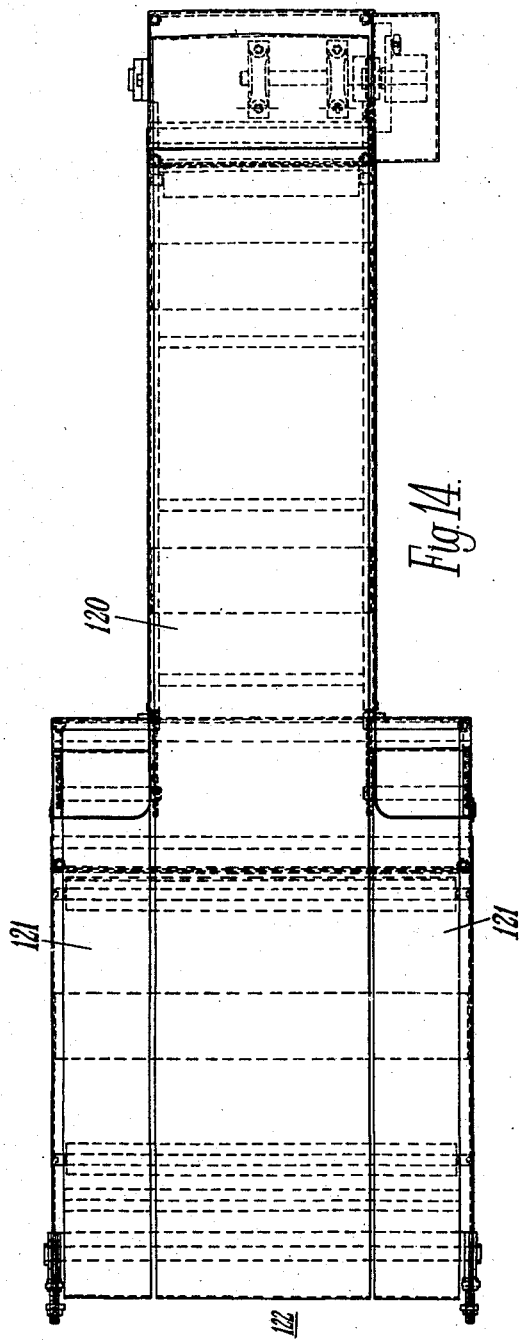

# United States Patent Office 3,495,551
Patented Feb. 17, 1970

3,495,551
MACHINES FOR MAKING FROZEN
CONFECTIONS
Antony Cecil Billingham, 28 Denbigh Gardens,
Richmond, Surrey, England
Filed Feb. 13, 1967, Ser. No. 615,405
Claims priority, application Great Britain, Feb. 14, 1966,
6,369/66
Int. Cl. F25c 7/04
U.S. Cl. 107—8                                11 Claims

ABSTRACT OF THE DISCLOSURE

A machine for making frozen confections has a main conveyer for freezing confections, an upper conveyer, means for transferring confections to the upper conveyer and coating transferred confections, and a common mechanical drive for the conveyers, and transfer and coating means, comprising a cam shaft, rocker arms, and connecting rods. The upper conveyer is driven from the shaft by a ratchet mechanism. Sticks are inserted in the confections by a reciprocating member acting on a sloping stack of sticks to lower the end stick. Confections are carried in strips of molds clipped to the main conveyer. The upper conveyer advances devices for picking up and carrying confections by a tongue engaging the sticks with a wedging action.

This invention relates to machines for making frozen confections.

The invention provides a machine for making frozen confections comprising a first endless conveying means having a succession of molds for said confections, freezing means traversed by the first conveying means for freezing confections in the molds, means for inserting upwardly projecting sticks in the confections, a second endless conveying means above the first endless conveying means, a succession of stick engaging devices transported by the second conveying means, means for lowering a stick engaging device from the second conveying means to engage one or more sticks of confections carried by the first conveying means and for returning the device and the confections engaged thereby to the second conveying means, and a common mechanical drive for intermittently advancing the first and second conveying means in step with each other and for lowering and returning a stick engaging device while the conveying means are stationary, which drive includes a main shaft driven by a prime mover, a first cam on the shaft, a first cam follower intermittently advanced by the first cam and positively coupled to the conveying means, a second cam on the shaft, and a second cam follower reciprocated by the second cam and positively coupled to the means for lowering and returning the stick engaging device, said means for lowering said device including linkages consisting of rocker arms and connecting rods to raise and lower the stick-engaging device and to raise and lower a further stick-engaging device from the second conveying means to dip-coat the confection or confections being carried thereby.

The invention also provides apparatus for inserting sticks into frozen confections, including a sloping channel adapted to contain a line of vertical sticks lying face to face and bearing against a vertical stop surface at the lower end of the channel, a vertically reciprocable member for pushing downwardly the lowest stick of the line to insert the stick into a confection below the stop surface, and an intermittently acting clamp acting on the side of the line to force the sticks against the stop surface during the downward motion of the vertically reciprocable member.

The invention is exemplified by the accompanying drawings, in which:

FIGURE 1c is an end view of the machine showing the said advancement means;

FIGURE 2 shows the general layout of the machine;

FIGURES 3a to 3d illustrate the construction of a conveyer for use in a machine for making frozen confections;

FIGURES 5a to 5b show, in side elevation and plan respectively, a vessel for storing and dispensing a confection to be frozen;

FIGURES 6 and 7 show, in side and end view respectively, means for gripping sticks frozen in the confections to remove the latter from the molds;

FIGURE 8 is an end view of the vessel shown in FIGURES 5a and 5b;

FIGURES 10 and 11 are front and side views of apparatus for inserting sticks in frozen confections;

FIGURES 12 and 13 show details of the apparatus of FIGURES 10 and 11, in side and plan view respectively; and FIGURE 14 is a plan view of a discharge conveyer.

Figure 1A:
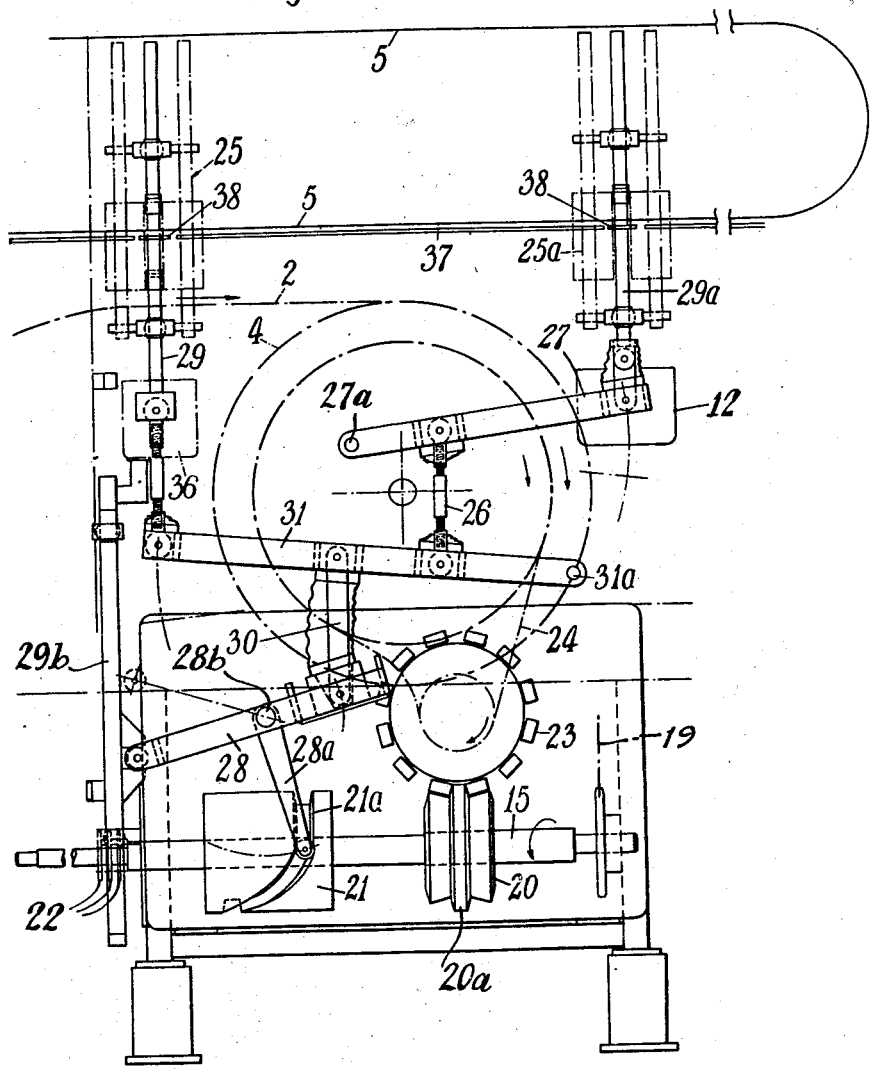
FIGURE 1a is a schematic side view of the delivery end of a machine for making frozen confections embodying my invention, showing the driving arrangement of the machine and rocker arm linkages.

The machine shown in FIGURES 1a–1c and 2 has a frame 1 along which moves linearly a first (main) endless conveyor 2 comprising a chain and a multiplicity of stainless steel molds. The conveyor chain is driven by two sets of sprockets 3, 4 secured adjacent to the two ends of the frame. Adjacent to one (delivery) end of the conveyor and above the molds is located a second endless conveyor 5 comprising a chain and a multiplicity of stick-engaging means 6 (FIGURES 6 and 7). This conveyor chain is driven around two further sprockets. Located adjacent to the other (entry) end of the conveyor and above the stainless steel molds is a hopper 9 for filling the molds with a fluid confection. The molds, after having been filled with the fluid confection, are passed downwardly into and through a freezing tank 10 where they are at least partially frozen before they traverse a stick-inserting mechanism 11 located above the molds for inserting a stick into each of the partially frozen confections. This stick-inserting mechanism is mounted for limited movement along the tank, to ensure that the sticks are always inserted into a partially frozen confection irrespective of the tank temperature. The passage of these molds in continued through the tank until the confections are fully frozen and, adjacent to the delivery end of the conveyor, they are raised from the tank 10 and are subjected to heat for a period sufficient for the frozen confections to be released from the walls of their corresponding molds. At this point, the stick-engaging mechanism 6 which is carried by the second conveyor is driven downwardly therefrom to engage the sticks and is subsequently retracted into the conveyor carrying with it the frozen confections released from the mold. The frozen confections are then transported along the second conveyor to a point intermediate its length at which the sticks and the confections depending therefrom are driven downwardly into a tank 12, containing, for example, liquid chocolate, in order to coat the confections with chocolate. The coated confections are then raised again into the path of the second conveyor 5 and transported along this conveyor to one end thereof adjacent to which they are released and dropped into bags laying in their downward path of fall, with the frozen confections thence being deposited on a plane conveyor belt 13 for subsequent packing.

Various other conventional operations such as the extraction of the center of the partially frozen confections and the subsequent filling thereof with a different fluid confection, and the "capping" of the frozen confections about the stick inserted therein may also be provided for by such a machine in a well known manner. In addition, during the return course of the first conveyor in which the molds are held upside down, these molds may be cleaned by an upward spray of hot and/or cold water.

The drive mechanism of the machine is common to both the first and the second conveyors and, in addition, provides the drive for various other timed operations effected by the machine. It is placed at the delivery end and, as shown schematically in FIGURE 1a, comprises a main drive motor 14, which drives a main shaft 15 through a reduction gear box 16, with the motor driving an input shaft 17 on the reduction gear box and the drive between the output shaft 17a of the reduction gear box and the main shaft being effected by a chain drive 19. Three sets of cams are located at axially spaced positions along the main shaft, comprising a globoidal cam 20 for effecting intermittent stepwise movement of the first (main) conveyor 2, a barrel or cylindrical cam 21 which is effective to operate the stick engaging mechanism and the mold heating and the chocolate dipping steps, and a group of axially spaced plate cams 22 which operate air valves (not shown) to time the movements of air cylinders effective to operate the filling, stick inserting, and various other functions performed by the machine. The cam 20 comprises a ridge 20a having a dwell portion visible in FIG. 1a, and at least one oblique indexing portion, not visible.

The ridge 20a engages between the teeth of a twelve station toothed index wheel 23 to drive the wheel which in turn is coupled through a chain drive 24 to the driving sprocket 4 of the main conveyor chain. More specifically, when the cam 20 rotates, the visible dwell portion, being in a plane perpendicular to the axis of rotation, simply passes between the teeth of the wheel and effects no rotation of the latter. When the oblique indexing portion engages the teeth, the wheel 23 is rotated clockwise by the pressure of the oblique portion on the teeth. The axial extent of the oblique portion is such that the wheel is advanced by one tooth pitch so that the next following tooth subsequently engages the ridge 20a. The ridge is, of course, provided with a gap to permit the teeth to move into and out of engagement therewith. Shaft 15 drives upper conveyor 5 as described below, in step with conveyor 2.

The barrel cam 21 has a first rocker arm 28 in engagement therewith through follower 28a, which arm rocks about pivot 28b in response to rotation of this cam. A rod 30 is secured to the free end of this arm 28 to couple it to a second rocker arm 31 pivoted at 31a and connected at its free end to a push rod 29 movable on vertical guides 25. Arm 31 is connected by a further push rod 26 to a third rocker arm 27 pivoted at 27a and connected at its free end to a rod 29a movable on further vertical guides 25a. Rod 29 operates the downward and upward motion of the stick engaging means, and the rod 29a effects further downward and upward movement of the frozen confections carried by the stick engaging means for chocolate-coating these confections by dipping the same in a tank of chocolate at 12.

A hot water tank 36 is carried by a rod 29b and the rod and tank are reciprocated by lever 28 as the latter rocks and tank 36 is arranged so as to periodically partially encase the outer sides of the confection-containing molds to heat these molds and loosen the confections from the inner sides of the molds.

The raising and lowering of the stick-engaging means is carried out as follows. The stick-engaging means consists of a series of bars spanning the conveyor 5 and carrying gripping devices as hereinafter described. These bars are not fixed to the conveyor chains but are pushed by the chains along guides 37. These guides have gaps level with the rods 29, 29a and the gaps are filled by guide pieces 38 fastened to the rods. When the rods are in their uppermost positions, the guide pieces 38 are aligned with guides 37 and the stick-engaging bars can travel across the gaps. The timing of the cams 20, 21 is so arranged that conveyor 5 pushes a stick-engaging bar onto guide pieces 38 and then halts while the associated rod 29 or 29a descends, carrying the bar with it, and then rises again, whereafter the conveyor 5 moves the bar onto guides 37 and replaces it on guide pieces 38 with a succeeding bar. Conveyor 2 moves in step with conveyor 5 and is therefore stationary when the rod 29 descends to pick up a row of frozen confections. Dwell portion 21a of cam 21 ensures that the rods are stationary while the conveyers move.

The upward movement of the hot water tank is effected simultaneously with the downward movement of the rods 29, 29a for the stick engaging and the chocolate coating steps, while the main and overhead conveyers are stationary. The cams 20, 21 are so arranged that cam 21 causes the arm 28 to move only while wheel 23 is stationary during the dwell period of cam 20.

The upper conveyor 5 is intermittently advanced by a ratchet mechanism driven from shaft 15. This shaft carries an eccentric 32 connected by a mechanical linkage 33 consisting of bellcranks 33a, 33b and rods 33c, 33d, 33e to an arm 34 which pivots on a shaft 35 in the housing of the upper conveyor and carries a pawl 110 spring-loaded against a ratchet wheel 111 fast with shaft 35 which carries sprockets 8. As shaft 15 rotates, arm 34 rocks and pawl 110 alternately slides over and engages the teeth of wheel 111 to advance the wheel and hence the upper conveyer intermittently in step with the main conveyer.

Figure 1D:
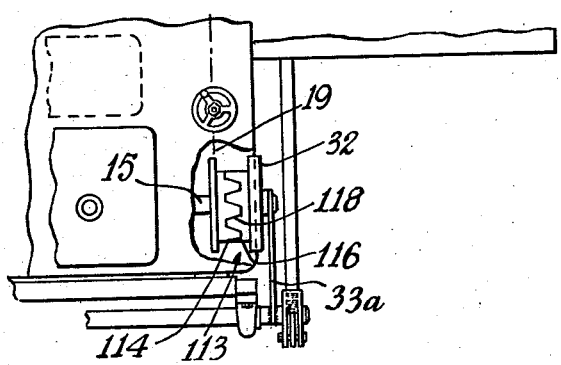
FIGURE 1d is a view partly in section illustrating alternate advancement means.
Figure 1B:
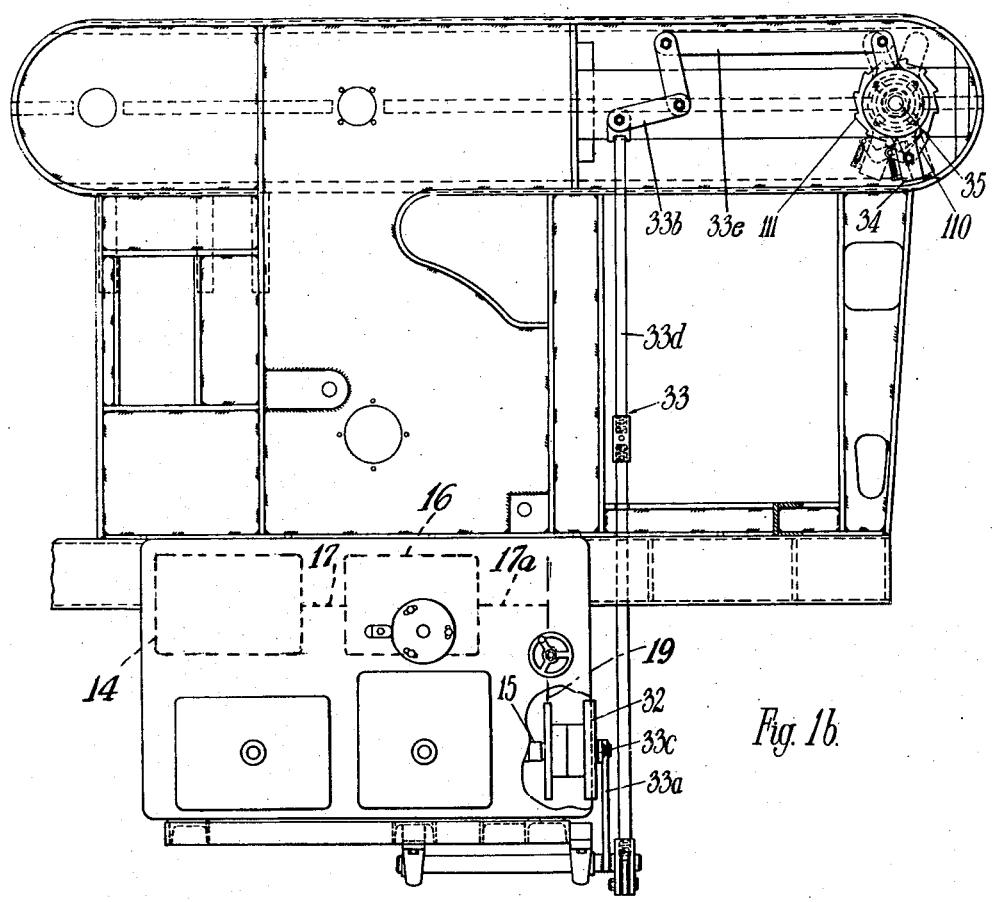
FIGURE 1b is a schematic side view of the delivery end of the machine showing means for advancing the upper conveyer.

It may be desirable to interpose a clutch e.g. between the main drive and crank 33a, to absorb shocks and sudden increases of load and so reduce the risk of damage. Conveniently, the clutch is a dog clutch 113 (FIGURE 1d) with tapered teeth 118, having a driving part 114 fast on a shaft on which a barrel cam 115 is rotatably journalled, with the cam 115 being fast with driven part 116 of the clutch and cooperating with a cam follower 117 on the crank 33a to rock the crank when the shaft is rotated. A shock will cause the clutch parts 114, 116 to separate owing to the taper of their teeth, so that the shock is not transmitted.

The coupling between the main drive motor and the reduction gear box may conveniently incorporate a variable speed drive and a clutch may be embodied in the coupling in order that the motor may run continuously.

A pivotally mounted L-section confection bag-retaining plate 39 is located in the path of downward movement of the confections which are released from the overhead conveyer and enveloped by a bag during their downward fall, with the bag being supported by guides 40 lying in the path of fall of each confection and being opened to receive the confection by an air blast governed by the plate cams 22 on the main shaft. The bag-retaining plate 39 initially lies in the position shown so as to arrest and retain the bagged confections and is thence pivotally moved by a rod operated by crank 28 to tilt the bagged confections and drop them on to the plane conveyor belt 13 for subsequent packing.

This conveyor belt may conveniently be driven in a stepwise manner by an air cylinder, again driven from the plate cams 22, to effect intermittent movement in timed relation to the pivotal movement of the bag-retaining plate, so as to be stationary and empty when a batch of bagged confections is dropped on it.

To transport the confections from the discharge end of the machine to packing operatives I may provide a conveyer as illustrated in FIGURE 14, comprising a main belt and a shorter belt on one or both sides of the main belt. If the machine exceeds a certain width corresponding to about a dozen confections, it is difficult for the operatives to reach all the confections on a discharge belt of the full width of the machine. By using two or more belts, of which one is longer, a stepped plan is obtained, so that confections discharged onto the longer belt can be removed by operatives downstream of those working on the shorter belt(s), with all the confections being in easy reach of the relevant operative. FIGURE 14 shows a central belt 120 and two shorter side belts 121, with a common drive; the belts are in line at the end 122 next to the machine but belts 121 are about half the length of belt 120 to give a stepped profile. The belts are driven from the machine, intermittently in step therewith, so that the confections are discharged onto the belts in rows instead of scattered as on a continuously driven belt.

The main conveyer 2 comprises two parallel roller chains 41 (FIGURES 3a and 3c) which run between fixed guides so as to constrain the chains and hence the molds carried thereby to follow the desired path through the freezing tank and past the other parts of the machine. The molds are carried by stainless steel strips 42 (see FIGURES 6 and 7) which span the main conveyer chains 41, with each strip carrying a row of welded stainless steel molds 43. The mode of attachment of the mold strips 42 to the chains is illustrated in FIGURES 3a to 3d together with FIGURE 6. In each of the chains 41 alternate side plates along one side are removed and replaced by L-section brackets 44, with one limb 45 of each bracket replacing the removed side plate and the other limb 46 projecting horizontally towards the other chain. The brackets 44 of one chain carry on their limbs 46 upstanding lugs 47 provided with caps 48, and the brackets 44 of the other chain carry pins 49 and, fastened to their limbs 45, leaf springs 50 which project through slots 51 in limbs 46. The mold strips have at one end slots 52 adapted to engage lugs 47 so that the edges of the lugs fit under caps 48, and at the other end holes 53 which fit over pins 49. The upper end of each spring 50 is bent over to form a lip 54 which engages the top of a mold strip fitted over pins 49.

The provision of the spring abutting one end of the strip facilitates the removal of these strips since by urging the spring away from its normal position in which it engages the end of the strip, the strip can be removed by being lifted upwardly clear of the spring and pulled outwardly from under the capped lug on the other conveyer chain. The re-insertion of the strip is readily effected by inserting one end of the strip under the capped lug and pressing the other end of the strip downwardly against the spring whereby it urges the spring away from its normal position, initially riding over it, with the spring then engaging with the upper side of the strip as the spring returns to its normal position.

As previously mentioned, the machine includes a hopper 9 for filling the mold with a liquid confection. FIGURES 4a, 4b, 4c, 5a, 5b, and 9.

The hopper per se is elongated and extends across the machine above the conveyer 2 at the end remote from the drive. It is pivoted at one end on a support carriage which can move along the frame 1; this pivoting enables the hopper to be swung clear of the conveyer for cleaning or adjustment of dispensing cups 55 which project therefrom in alignment with the molds as the latter pass underneath (see FIGURE 5a).

Each cup 55 has an inlet valve 56 at its top end and an outlet valve 57 at its lower end and the capacity of the cup is equal to the volume of liquid to be deposited in each mold; the cup capacity can be adjusted by placing rings 55a (FIGURE 4a) or other packings in the cup between the valves to reduce the free volume within the cup. The upper valve 56 is secured to a hollow tube 58 which extends upwardly and is supported for axial movement by guide 59 within the hopper 9. The lower valve 57 is secured to a rod 60 which extends upwardly coaxially through the aforesaid tube 58 and is similarly supported by guide 61 within the hopper. The movement of the tube 58 and rod 60 is effected through a common air cylinder 62 which is driven from the plate cams 22 shown in FIGURE 1. This air cylinder is arranged to drive a pivotally mounted shaft 68 carrying arms 63 associated with the cups, with one end of each arm 63 operating a cylindrical slider 64 which embraces the rod 60 secured to the lower valve and is arranged to abut a stop 65 on this rod and a stop 66 on the end of the tube 58 secured to the upper valve.

Figure 4A:
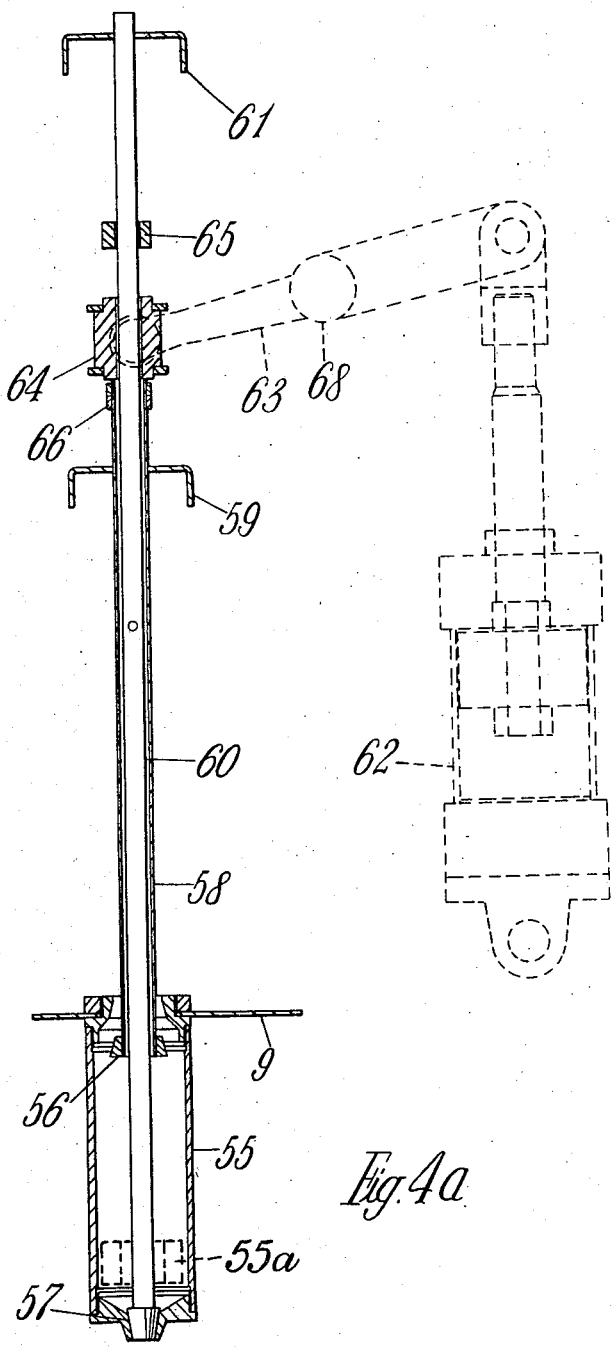
FIGURES 4a to 4c show means for dispensing a confection to be frozen.
Figure 4B:
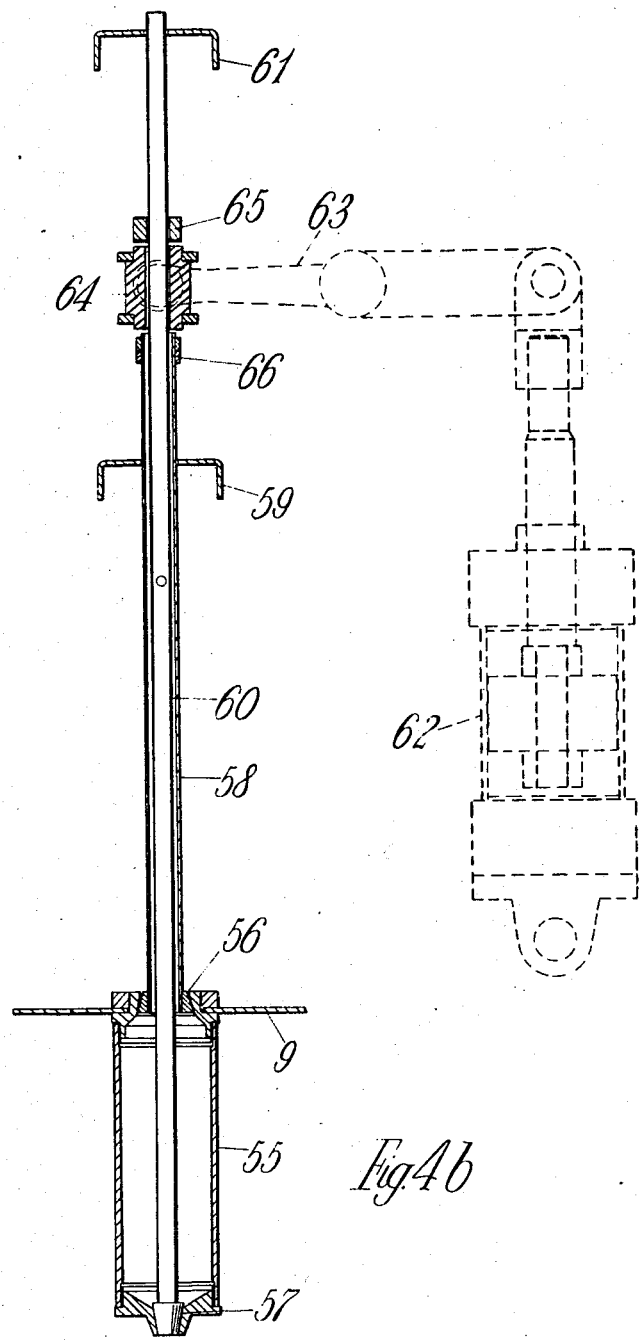
Figure 4C:
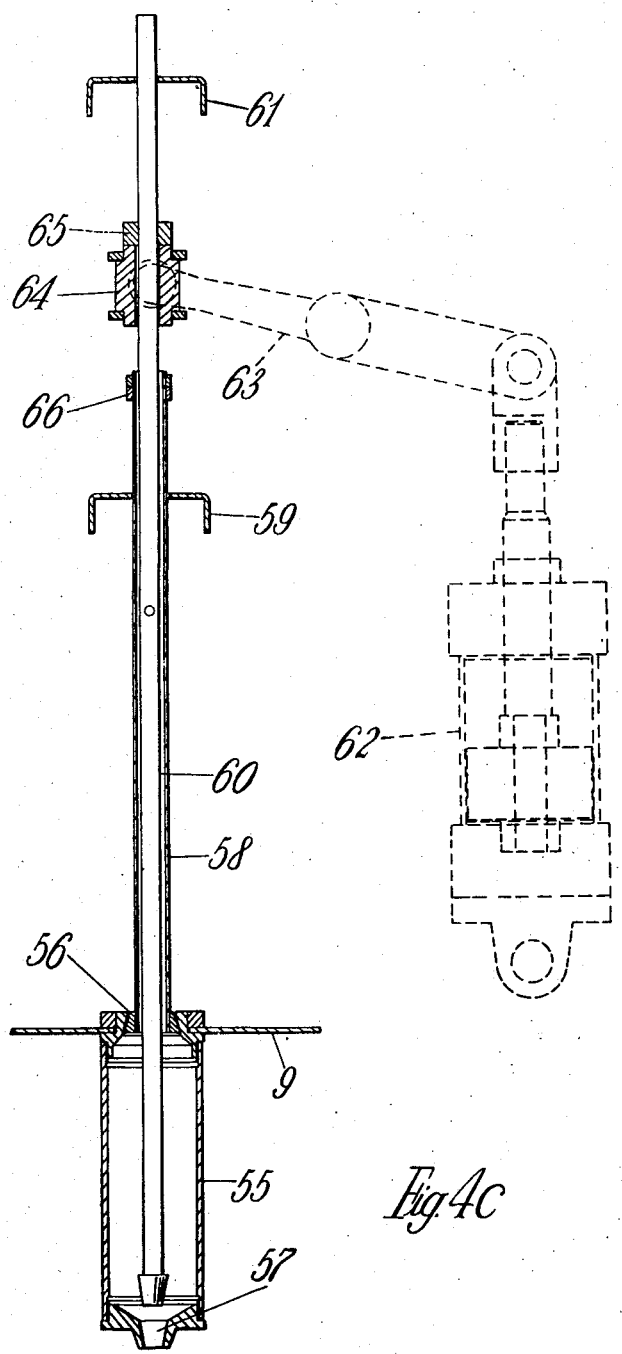

The air cylinder is operated in synchronism with the movement of the main chain 2 and is arranged first to move the arm downwardly so that slider 64 engages stop 66 to depress the upper valve and so permit the cup to be filled with fluid from the hopper (FIGURE 4a). It is then moved upwardly so that the upper valve closes under the restoring action of a spring (not shown) (FIGURE 4b); after this valve has closed, the slider abuts the stop 65 on the rod 60 secured to the lower valve while the main conveyer chain is arrested whereupon the lower valve is raised to permit the fluid in the cup to be discharged into the mold with which it is aligned (FIGURE 4c).

Subsequently, the arm moves downwardly to permit the lower valve to close and the cycle is repeated.

Figure 9:
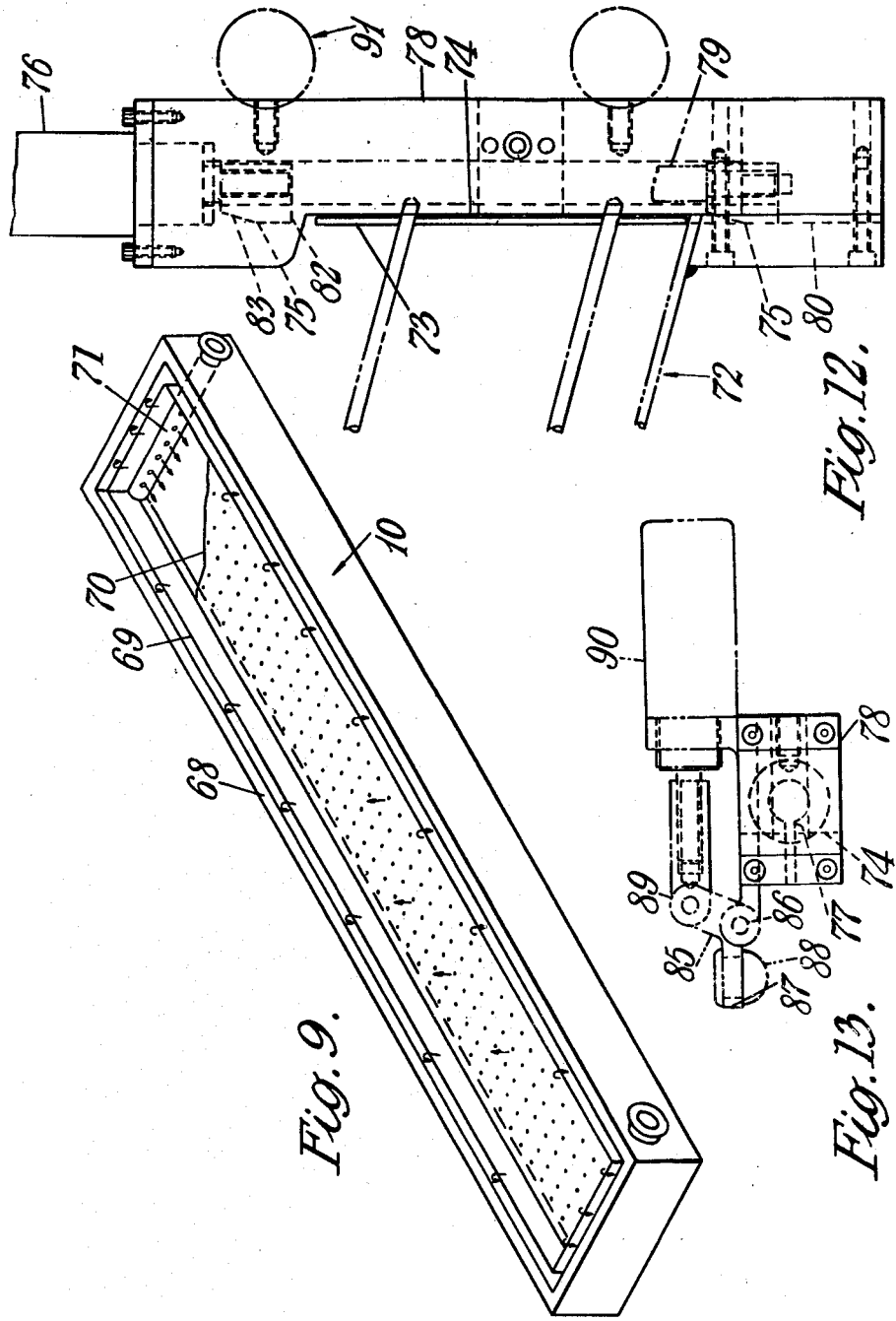
FIGURE 9 is a perspective view of a cooling tank for freezing confections.

FIGURE 5a is a general view of the filler showing the line of cups extending across the main chain drive, with each being aligned with a respective one of each row of the molds being transported. FIGURE 5b is a corresponding plan view. A float valve or float switch 67 is provided to control the supply of fluid to the hopper 9 so that the latter is always full during operation. FIGURE 9 is a corresponding end view of the hopper.

Figure 10:
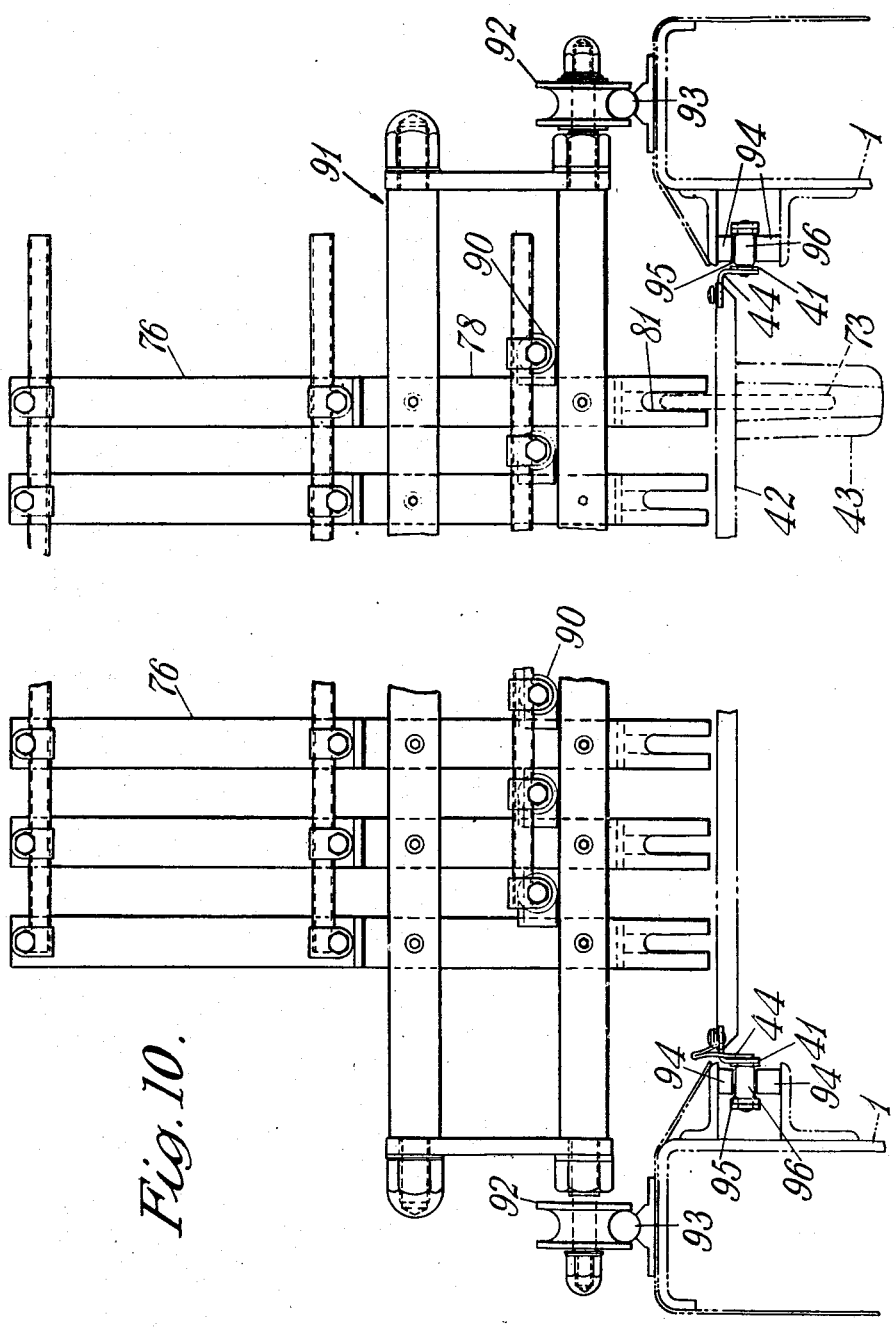

After being filled, the molds are carried down by the main conveyer 2 and immersed in a bath of brine (or other refrigerant) in a tank 10 shown in more detail in FIGURE 10. The tank has an insulated outer wall 68 and contains an inner tank 69 whose walls are spaced from those of the outer tank. The inner tank has a perforated false bottom 70 and cold brine is fed to the space below this false bottom through a perforated inlet pipe 71. The brine rises through the false bottom 70 and spills over the edges of the inner tank into the outer tank 10 from which it is withdrawn for recooling, as shown by the arrows.

As the molds are carried along the tank 10 the fluid confection in the molds freezes and when it is partly frozen a stick is inserted into it by stick inserter 11 which is shown in detail in FIGURES 10 to 13. The stick inserter comprises a number of downwardly sloping channels 72 corresponding to and aligned with the number of molds 43 extending transversely of the main conveyer 2 and being transported thereby. In each of these channels is deposited a multiplicity of upright sticks 73 which abut each other and descend along the channel to abut a stop 74 at the lower end thereof. Located above this stop is a blade 75 which is reciprocably moved by an air cylinder 76, controlled by one of the valves operated by plate cams 22 shown in FIGURE 1, and which on its downward path engages the stick 73 abutting the end stop 74 to drive this stick into a partly frozen confection aligned with and lying below this end stop. The subsequent retraction of this blade permits the remaining sticks to travel downwardly along the channel so that the next adjacent stick abuts the end stop. FIGURE 12 shows the finger in both extreme positions. Subsequently the cycle is repeated, with the blades being depressed during each period in the intermittent drive in which the main chain is arrested.

The blade 75 runs in a slot 77 of a guide block 78, projecting from a face of the block 78 which constitutes the stop 74 by an amount slightly less than the thickness of a stick. The blade is carried on a piston rod 79 of the air cylinder 76 which runs in the guide block 78. The lower end of the guide block extends below the channel 72 and contains a slot 80 for guiding the descending stick and an opening 81 for allowing passage of the inserted stick when the conveyer moves on. When the blade descends, its square lower edge 82 strikes the lowest stick and forces it down through slot 80; when the blade rises, its oblique upper edge 83 slips past the succeeding sticks which then move down under the influence of a weight 84 to rest against stop 74.

To ensure that the lowest stick rests against stop 74 over its whole length and thus to avoid malfunctions which might be caused by bent sticks, a reciprocating clamp is mounted on each guide block 78. Each clamp includes a bell crank 85 pivoted about a vertical pivot 86 and having an arm 87 carrying a rubber pad 88 lying alongside the line of sticks in the channel. The other arm 89 of the crank is connected to a small air cylinder 90 mounted on the guide block 78 and controlled by one of the valves operated by the plate cams 22. The air cylinder 90 periodically, while blade 75 is in its uppermost position or descending, pivots the crank 85 so as to press the pad 88 obliquely against the sides of the sticks in the channel, thus forcing them against the stop 74. As the blade 75 is raised, the pad 88 is withdrawn to allow the sticks to move as a body down the channel.

The several assemblies of channels, guide blocks, and air cylinders constituting the stick inserter 11 are carried by a framework 91 which runs on wheels 92 along rails 93 along the sides of the main machine frame 1. This enables the position of the inserter 11 to be adjusted in accordance with the progress of the freezing of the confections along the tank 10 so as to ensure that the confections into which the sticks are inserted are always sufficiently frozen to hold the sticks vertical after insertion but not so frozen as to prevent insertion of the sticks.

FIGURE 11 also shows how the main conveyer 2 is supported in the main frame 1. As previously described, the conveyer 2 consists of two parallel roller chains 41 carrying brackets 44 which support mold strips 42. Along each side of frame 1 are two parallel guide strips 94 defining therebetween a guide track 95 in which run rollers 96 of chain 41. The chains can, by guide strips 94, be constrained to follow a desired path through the machine.

As the molds approach the end of tank 10 they are lifted therefrom and enter the mold stripping, chocolate coating, and bagging apparatus described with reference to FIGURE 1. The stick gripping device 6 used in the latter will now be described with reference to FIGURES 6 and 7. The device comprises a metal bar 97 having end flanges 98 which run on guides 37 and 38 and is engaged by chain 5 for moving the bars along the guides. To the bar perforated lugs 100 are fastened, and metal boxes 99 are attached to the bar, one for each mold 43 of a mold strip 42, by means of a pin 102 passed through lugs 100 and holes in the boxwalls. Each box has fixed front and rear surfaces 103, 104 and a pin 112 on which pivots a tongue 101 carrying an arm 105, projecting above bar 97, and a cup 109 facing surface 104. The direction of motion in use is shown by arrow 107. The free edge of tongue 101 lies next to surface 103 and is urged towards it by a pad 108 of expanded neoprene rubber in cup 109. When guide 38 descends it carries down a bar 97 which approaches the molds immersed in tank 36 so that the sticks of the confections contained in the molds enter the boxes 99 and push their way between tongues 101 and the surface 103. When the bar rises again, the sticks are wedged between the tongues and the surface 103 because of the pressure of pads 108 and the slope of the tongues, and are lifted together with the frozen confections. To release the confections for bagging, a bar 106 (FIGURE 1) extends across the upper conveyer so as to strike arms 105 to deflect the same and hence tongues 101 away from the sticks, thus freeing the latter.

Above, I have described a filler for filling the molds with a liquid confection for making iced lollipops. Instead there may be a filler for filling ice cream.

I claim:

1. A machine for making frozen confections comprising a first endless conveying means having a succession of containers for said confections, freezing means traversed by the first endless conveying means for freezing confections in the containers, means for inserting upwardly projecting sticks in the confections, a second endless conveying means, a succession of stick-engaging devices transported by the second endless conveying means, means for lowering a stick-engaging device from the second endless conveying means to engage one or more sticks of confections carried by the first endless conveying means and for returning said device and the confection or confections engaged thereby to the second endless conveying means, means for raising a hot water tank into thawing relationship with successive containers during engagement of one or more sticks of frozen confection therein by said devices, and a common mechanical drive for intermittently advancing the first and second endless conveying means in step with each other and for lowering and returning a stick-engaging device while the endless conveying means are stationary, which drive includes a main shaft driven by a prime mover, a first cam on the shaft, a first cam follower intermittently advanced by the first cam and positively coupled to the first endless conveying means, a second cam on the shaft, and a second follower reciprocated by the second cam and positively coupled to the means for raising the hot water tank and also to the means for lowering and returning the stick-engaging device, said means for lowering said device including linkages consisting of rocker arms and connecting rods to raise and lower the stick-engaging device and to raise and lower a further stick-engaging device from the second endless conveying means to dip-coat the confection or confections being carried thereby.

2. The machine as claimed in claim 1, in which the first cam is a globoidal cam and the first cam follower is an index wheel.

3. A machine for making frozen confections comprising a first endless conveying means having a succession of containers for said confections, freezing means traversed by the first endless conveying means for freezing confections in the containers, means for inserting upwardly projecting sticks in the confections, a second endless conveying means, a succession of stick-engaging devices transported by the second endless conveying means, means for lowering a stick-engaging device from the second endless conveying means to engage one or more sticks or confections engaged thereby to the second endless conmeans and for returning said device and the confection or confections engaged thereby to the second endless conveying means, and a common mechanical drive for intermittently advancing the first and second endless conveying means in step with each other and for lowering and returning a stick-engaging device while the endless conveying means are stationary, which drive includes a main shaft driven by a prime mover, a globoidal cam on the shaft, an index wheel intermittently advanced by the globoidal cam and positively coupled to the first endless conveying means, a second cam on the shaft, and a second follower reciprocated by the second cam and positively coupled to the means for lowering and returning the stick-engaging device, said means for lowering said device including linkages consisting of rocker arms and connecting rods to raise and lower the stick-engaging device and to raise and lower a further stick-engaging device from the second endless conveying means to dip-coat the confection or confections being carried thereby, and the endless conveying means being first and second chain conveyors, with the first conveyor being driven by the index wheel and the second conveyor being driven intermittently from the main shaft by means of a mechanical linkage and a ratchet mechanism.

4. The machine as claimed in claim 3 in which there is interposed between the main shaft and the ratchet mechanism a dog clutch with tapered teeth.

5. The machine as claimed in claim 1, in which the second cam is a barrel cam and the second cam follower is provided on a first rocker arm connected by a first connecting rod to a second rocker arm connected by a second connecting rod to a third rocker arm, with the second rocker arm being operatively connected to a first push rod for lowering and raising the first mentioned stick engaging device and the third rocker arm being operatively connected to a second push rod for lowering and raising the second stick engaging device, said devices being pushed along stationary guiding means by the second endless conveying means, the guiding means supporting the devices in the vertical direction and having a vertically movable portion attached to the second push rod so that vertical reciprocatory movement of the second push rod responsive to rotation of the barrel cam will cause a stick-engaging device supported by the said vertically movable portion to descend towards the first endless conveying means and return to the second endless conveying means, said device being subsequently removed from said vertically movable portion by advancement of the second endless conveying means.

6. A machine for making frozen confections comprising a first endless conveying means having a succession of containers for said confections, freezing means traversed by the first endless conveying means for freezing confections in the containers, means for inserting upwardly projecting sticks in the confections, a second endless conveying means, a succession of stick-engaging devices transported by the second endless conveying means, means for lowering a stick-engaging device from the second endless conveying means to engage one or more sticks of confections carried by the first endless conveying means and for returning said device and the confection or confections engaged thereby to the second endless conveying means, and a common mechanical drive for intermittently advancing the first and second endless conveying means in step with each other and for lowering and returning a stick-engaging device while the endless conveying means are stationary, which drive includes a main shaft driven by a prime mover, a first cam on the shaft, a first cam follower intermittently advanced by the first cam and positively coupled to the first endless conveying means, a second cam on the shaft, and a second follower reciprocated by the second cam and positively coupled to the means for lowering and returning the stick-engaging device, said means for lowering said device including linkages consisting of rocker arms and connecting rods to raise and lower the stick-engaging device and to raise and lower the further stick-engaging device from the second endless conveying means to dip-coat the confection or confections being carried thereby, a conveyor assembly for carrying frozen confections from the discharge end of the machine comprising a main conveyor belt and at least one shorter conveyor belt at the side thereof, said belts being aligned at their ends adjacent to the discharge end of the machine, and a driving connection for driving the belts intermittently in step with the machine.

7. In a machine for making frozen confections, stick-inserting means including a sloping channel adapted to contain a line of vertical sticks lying face to face and bearing against a vertical stop surface at the lower end of the channel, a vertically reciprocable member for pushing downwardly the lowest stick of the line to insert said stick into a confection container below the stop surface, and an intermittently acting clamp acting on the side of said line to force the sticks against the stop surface during the downward motion of the vertically reciprocable member, with said motion occurring while said container is stationary.

8. The machine as claimed in claim 7, in which the clamp includes a resilient pad on a lever pivoted at the side of the channel, and an air cylinder for reciprocating said lever to press the pad obliquely against the side of the line of sticks.

9. Apparatus as claimed in claim 7 in which the stop surface is formed with a vertical slot and the vertically reciprocable member is a flat blade slidable in the slot and projecting therefrom by a distance not exceeding the thickness of a stick.

10. In a machine for making frozen confections containing projecting sticks, a device for engaging said sticks to hold the confections suspended, said device having a pair of fixed surfaces, a pivoted tongue, a pad of resilient material, and a cup fast with said tongue, said pad being confined between said cup and one of said surfaces to urge said tongue towards the outer of said surfaces, the tongue being arranged and adapted to retain the sticks by a wedging action against the said other fixed surface and being pivotally mounted, a projecting arm being provided for pivoting the tongue away from said other surface to release a stick retained thereby.

11. The stick-engaging device as claimed in claim 10, including a supporting bar, a plurality of boxes, each provided with a pair of fixed surfaces, a tongue, a pad of resilient material, and a projecting arm, and a retaining pin attaching the boxes to the bar to form a row of boxes, perforated lugs being fixed to the bar and holes being provided in the walls of the boxes to receive the pin.

References Cited

UNITED STATES PATENTS

| | | | |
|---|---|---|---|
| 1,522,762 | 1/1925 | Tyler | 24—255 |
| 1,960,456 | 5/1929 | Robb. | |
| 2,251,333 | 8/1941 | Griffin et al. | |
| 2,647,673 | 8/1953 | Galik | 221—258 |
| 2,903,979 | 9/1959 | Behling | 107—8.05 |
| 3,031,978 | 5/1962 | Rasmusson | 107—8.05 |
| 3,082,709 | 3/1963 | Jacobsen | 107—8.2 |
| 3,085,520 | 4/1963 | Fiedler | 107—8.05 |

EDWARD L. ROBERTS, Primary Examiner

U.S. Cl. X.R.

221—258